United States Patent [19]
Kim

[11] Patent Number: 5,372,326
[45] Date of Patent: Dec. 13, 1994

[54] REEL DRIVING APPARATUS FOR TAPE RECORDER

[75] Inventor: Woon-bae Kim, Seoul, Rep. of Korea

[73] Assignee: Samsung Electronics Co., Ltd., Kyungki-do, Rep. of Korea

[21] Appl. No.: 11,541

[22] Filed: Feb. 1, 1993

[30] Foreign Application Priority Data

Jan. 30, 1992 [KR] Rep. of Korea ............ 92-1321

[51] Int. Cl.$^5$ .................................... G11B 15/43
[52] U.S. Cl. ........................................ 242/356.6
[58] Field of Search ............... 242/201, 202, 204, 206, 242/208; 360/95, 96.1, 96.3, 96.4

[56] References Cited

U.S. PATENT DOCUMENTS

| | | | |
|---|---|---|---|
| 4,044,868 | 8/1977 | Berger | 242/201 X |
| 4,059,245 | 11/1977 | Hirose | 242/201 |
| 4,252,284 | 2/1981 | Suzuki | 242/204 X |
| 4,260,120 | 4/1981 | Urata et al. | 242/201 |
| 4,346,859 | 8/1982 | Osanai | 242/201 |
| 4,709,871 | 12/1987 | Tanaka et al. | 242/201 X |
| 4,711,410 | 12/1987 | Gwon | 242/201 |
| 4,819,891 | 4/1989 | Kamijo | 242/201 |
| 5,214,551 | 5/1993 | Kaneda | 242/201 X |

Primary Examiner—Daniel P. Stodola
Assistant Examiner—John P. Darling
Attorney, Agent, or Firm—Sughrue, Mion, Zinn, Macpeak & Seas

[57] ABSTRACT

A reel driving apparatus for a tape recorder includes two reel tables and a plurality of intermediate gears for connecting driving gears with each other. The power is transmitted to the reel tables via the intermediate gears according to the rotating direction of the driving gear, thereby accomplishing a rapid mode change. Further, in the apparatus, tape loosening does not occur.

32 Claims, 4 Drawing Sheets

REEL DRIVING APPARATUS FOR TAPE RECORDER

BACKGROUND OF THE INVENTION

The present invention relates to a reel driving apparatus for a tape recorder, and particularly to a reel driving apparatus for a tape recorder having an improved structure to accomplish a rapid mode change.

FIG. 1 schematically illustrates a conventional reel driving apparatus. In FIG. 1, a supply reel disk 6 and a take-up reel disk 1 for seating the reels of a tape cassette (not shown) are provided on the deck (not shown) of a tape recorder. A driving gear 4 driven by a driving source (not shown) is installed between reel disks 6 and 1. An idler 5 is connected to driving gear 4 by a connecting lever 7 so as always to engage the driving gear. Thus, idler 5 is movable while being engaged with the driving gear 4. A friction brake 3 is provided on the side of take-up reel disk 1 to be in frictional contact therewith. A tension band 8 operated by a tension pole (not shown) is wound around a lower disk (not shown) frictionally rotated with supply reel disk 6.

Friction brake 3 is in frictional contact with take-up reel disk 1 to apply tensile force to the tape during a review (REV) mode or rewind (REW) mode. Tension band 8 gives tensile force to the tape by braking the lower disk during a play (PLAY) or fast-forward (FF) mode.

In such a conventional reel driving apparatus, during the PLAY and FF modes, idler 5 is rotated clockwise by the rotational force of driving gear 4, to be driven while engaged with take-up reel disk 1. During the REV and REW mode, driving gear 4 is rotated counterclockwise so that idler 5 is driven while engaged with supply reel disk 6. Accordingly, idler 5 is driven so as to be selectively engaged with reel disks 6 and 1, according to the selected modes.

However, in the driving apparatus, since, during mode change, idler 5 is detached from reel disks 6 and 1 and at the same time the tape is compressively conveyed by a pinch roller (not shown) and a capstan shaft (not shown), the tape becomes loosened from the reels. Thus, in a tape recorder employing the conventional reel driving apparatus, the quality of reproduced pictures is deteriorated and noise is created. Further, the apparatus requires an additional device for driving the friction brake installed to provide the tape with specific tensile force, thereby complicating the structure.

SUMMARY OF THE INVENTION

Therefore, it is an object of the present invention to provide a reel driving apparatus for a tape recorder in which mode change is rapidly carried out so as to prevent a tape from loosening.

It is another object of the present invention to provide a reel driving apparatus for a tape recorder which has a simplified structure.

To accomplish the objects, there is provided a reel driving apparatus for a tape recorder comprising: reel disks at which a tape reel is seated: two reel tables having felt tables installed at the same axis as the reel disks to have the same rotational force and having friction felts, and direction controllers provided between the reel disks and felt tables and frictionally rotated and raced selectively with the felt tables according to the rotating direction; a driving gear provided between the two reel tables and driven by a specific driving source; intermediate gears interconnecting the driving gear and direction controllers of the reel tables; and tape tension means provided on the side of at least one of the reel tables.

In the present invention, during the PLAY and FF mode, the rotational force of the driving gear is transmitted to the direction controller built in the take-up reel table via the intermediate gear, and the direction controller is frictionally rotated with the felt table of the take-up reel table. Thus, the take-up reel disk is driven by the rotational force of the driving gear. Meanwhile, the reel disk of the supply reel table is raced by the direction controller built in the supply reel table. During the REV and REW modes, as the rotating direction of the driving gear is changed, the supply reel disk is frictionally rotated and the take-up reel disk is raced.

The reel tables are driven while being connected with the driving gear via the intermediate gears, so that the mode change according to the rotating direction of the driving gear occurs immediately.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

The reel driving apparatus of the present invention will be described being employed in a miniature tape recorder such as a camcorder.

Figure 1:
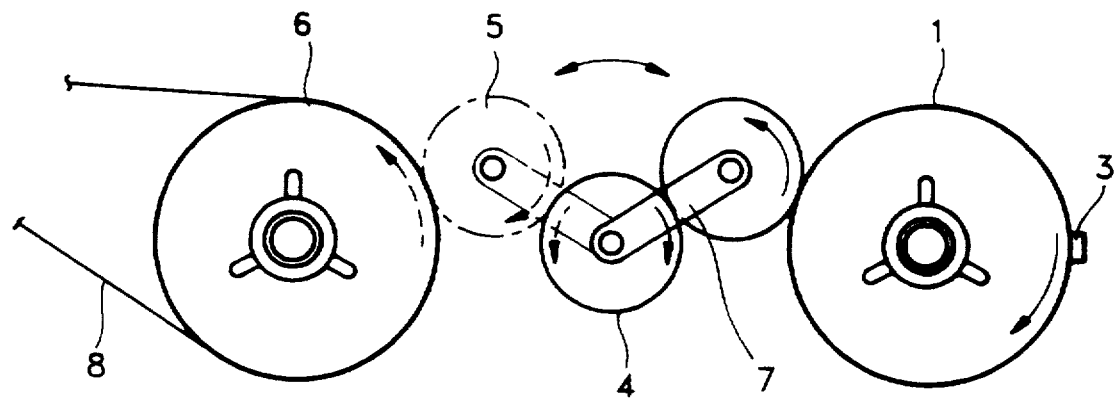
FIG. 1 is a schematic view of a conventional reel driving apparatus.
Figure 2:
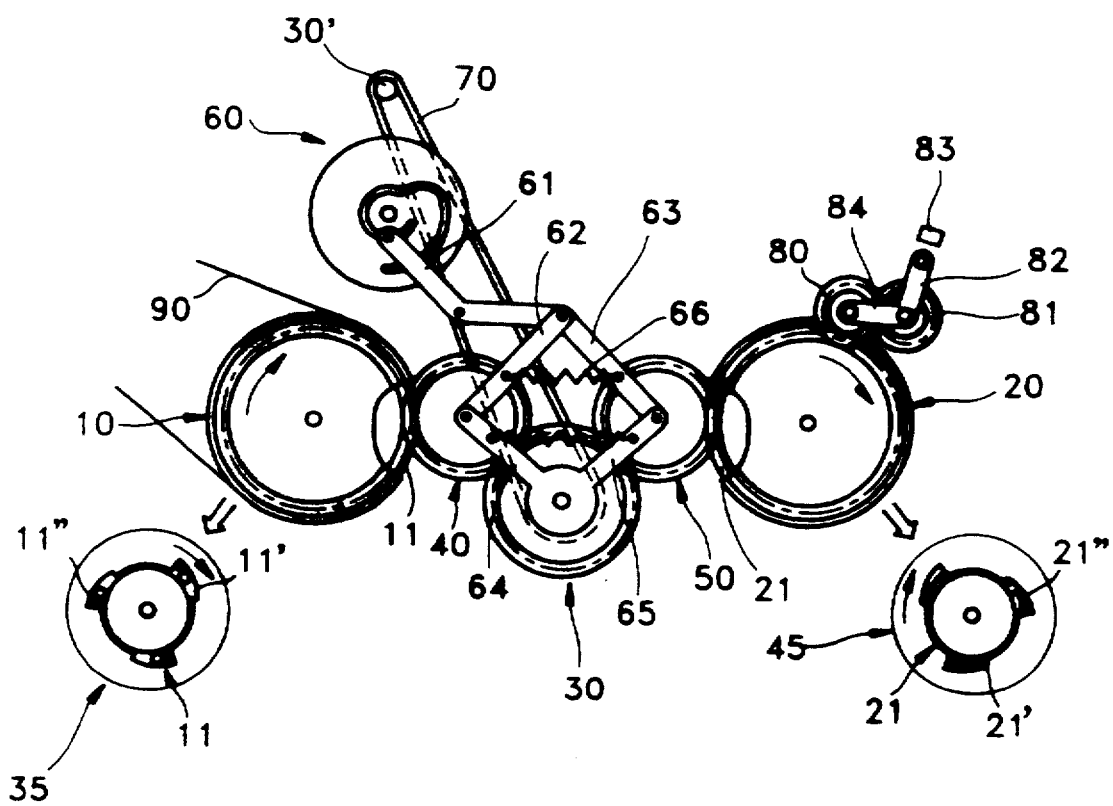
FIG. 2 is a schematic view of a reel driving apparatus of the present invention, so as to explain the PLAY mode and FF mode.
Figure 3:
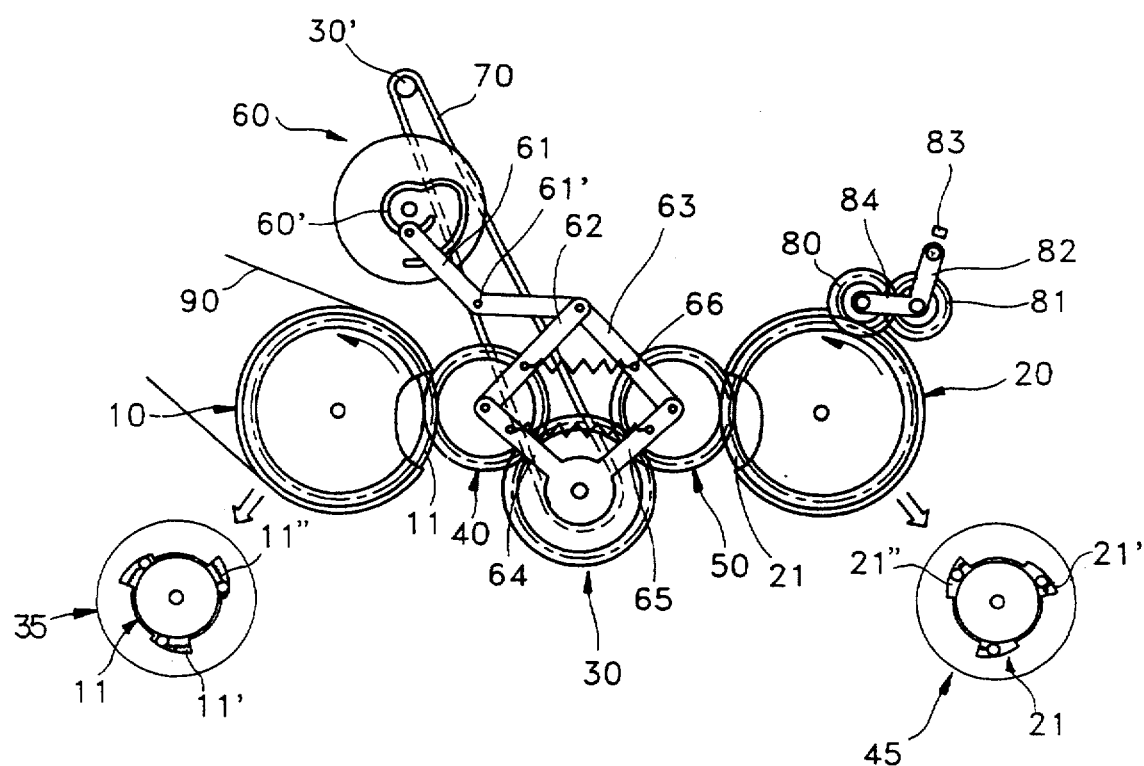
FIG. 3 is a schematic view of a reel driving apparatus of the present invention, so as to explain the REV mode and REW mode.
Figure 4:
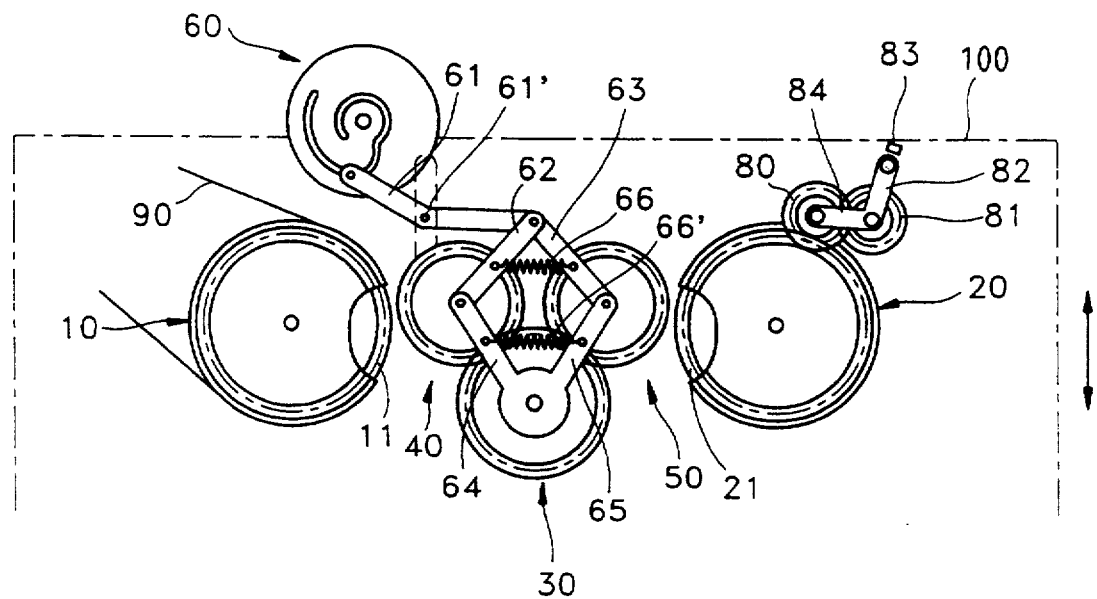
FIG. 4 is a schematic view of a reel driving apparatus of the present invention, so as to explain the operation of separating intermediate gears from a reel table.

Referring to FIGS. 2-5, a supply reel table 10 and a take-up reel table 20 each comprises a reel disk 14 or 24 for seating a tape reel (not shown), a felt table 17 or 27 having a frictional felt 16 or 26 and positioned at the same axis 10' or 20' as that of reel disk 14 or 24 to have the same rotation force as that of the reel disk, and a direction controller 35 or 45 provided between reel disk 14 or 24 and felt table 17 or 27 to be frictionally rotated and raced with felt table 17 or 27 according to a rotating direction. A spring 15 or 25 is installed between reel disk 14 or 24 and direction controller 35 or 45 to put direction controller 35 or 45 in contact with felt table 17 or 27. Reel table 10 or 20 is installed to be rotatable in a deck 100. Deck 100 is movable by a driving device (not shown) as shown in FIG. 4.

A driving gear 30 driven by a driving source is placed between the two reel tables 10 and 20. Intermediate gears 40 and 50 are placed between driving gear 30 and reel tables 10 and 20. Driving gear 30 and reel tables 10 and 20 are connected with each other by intermediate gears 40 and 50. Driving gear 30 is driven by being connected with the axis 30' of the driving source and a belt 70. Intermediate gears 40 and 50 can be coupled or detached to/from reel tables 10 and 20 by a detaching device.

The detaching device is constructed to comprise a plurality of links 62–65 for connecting driving gear 30 and intermediate gears 40 and 50 so that they are always engaged with each other and intermediate gears 40 and 50 are movable along driving gear 30, a cam 60 driven by a driving source and having a cam flute 60', a cam lever 61 pivotally installed by a pivot 61' to be rotatable and one end of which is connected to links 62 and 63 and the other end of which is engaged with cam 60, and springs 66 and 66' connected between the plurality of links 62–65.

Figure 5:
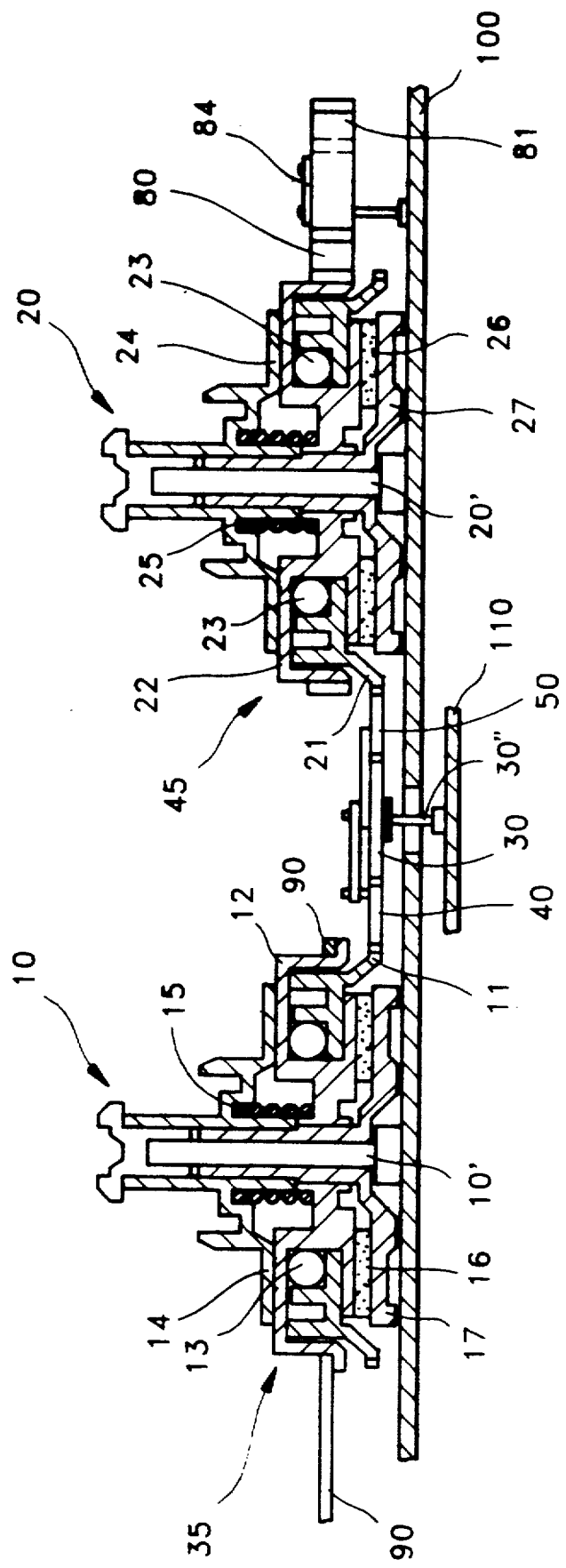
FIG. 5 is a schematic cross-sectional view of a reel driving apparatus according to the present invention.

Four links 62–65 are hinged at the respective rotational centers of intermediate gears 40 and 50 and driving gear 30. Links 62–65 are rotated by springs 66 and 66' so that intermediate gears 40 and 50 are detached from reel tables 10 and 20. Here, intermediate gears 40 and 50 are supported by links 62–65 to be installed on deck 100. Pivot 61' of cam lever 61 and the axis 30" of driving gear 30, as shown in FIG. 5, are fixed to a base 110 under deck 100. (The installation state of the pivot is not shown in FIG. 5.) Here, with reference to FIGS. 5–7, direction controllers 35 and 45 each provided on reel table 10 or 20 comprises a driven disk 12 or 22 rotated at the same axis 10' or 20' as that of reel disk 14 or 24 and having an annular groove (no reference number), and a driving disk 11 or 21 connected to the groove of driven disk 12 or 22, on the inner periphery of which a slanted groove 11' or 21' is formed and on the outer periphery of which a gear 11a or 21a is formed to be engaged with intermediate gear 40 or 50. One end of a spring 11" or 21" is fixed to the wall of slanted groove 11' or 21' and a ball 13 or 23 is connected to the other end of the spring.

Here, ball 13 or 23 is moved according to the rotating direction of driving disk 11 or 21 in slanted groove 11' or 21' so as to be put between or released from the wall of the groove of driven disk 12 or 22 and the wall of slanted groove 11' or 21'.

A tension device is provided on reel tables 10 and 20 to give a tensile force to the tape. A tension device for providing the tape coming out from the supply reel during PLAY or FF modes with tensile force is constructed by a tension band 90 tensioned by a tightening device (not shown) and looped around the driven disk 12 of supply reel table 10. As usual, tension band 90 may be tightened by a tension pole (not shown) engaged along the movement of a pole base in which a guide pole for discharging the tape from the tape cassette is installed.

A tape tension device for providing the tape coming out from the take-up reel during REV or REW with tensile force comprises a fixed gear 80 driven being engaged with driven disk 22 of take-up reel table 20, a floating gear 81 engaged with fixed gear 80 and moved along fixed gear 80 so as to be connected to or separated from driven disk 22 in the rotating direction of fixed gear 80, and a connecting lever 84 for connecting fixed gear 80 and floating gear 81. An extended portion 82 is formed to be extended from connecting lever 84 and a stop 83 for blocking extended portion 82 is provided at one location within the rotation range of connecting lever 84, so as to prevent over-rotation of the floating gear due to the rotation of fixed gear 80. The tape tension device provided on the side of take-up reel table 20 may be installed on the side of supply reel table 10.

The operation of the reel, driving apparatus of the present invention will be described below.

Referring to FIG. 4, first, when a tape cassette is still unloaded, cam lever 61 is rotated counterclockwise due to the rotation of cam 60. Then, intermediate gears 40 and 50 come toward each other by being rotated in the direction of links 62–65 approach each other by springs 66 and 66'. The distance between intermediate gears 40 and 50 and driving gear 30 becomes smaller than that between reel tables 10 and 20. The tape cassette is mounted on reel table 10 or 20, and deck 100 is loaded toward a rotating head drum (not shown).

Upon completion of the loading (as shown in FIG. 2) cam lever 61 is rotated clockwise by cam 60 rotated by a driving source (not shown). Here, intermediate gears 40 and 50 are moved in the direction that they become separated by links 62–65, so as to be engaged with driving disks 11 and 21 of reel tables 10 and 20. Here, springs 66 and 66' are in the state of tension. (In FIGS. 2 and 3, driving disks 11 and 21 of direction controllers 35 and 45 are additionally illustrated.)

Figure 6:
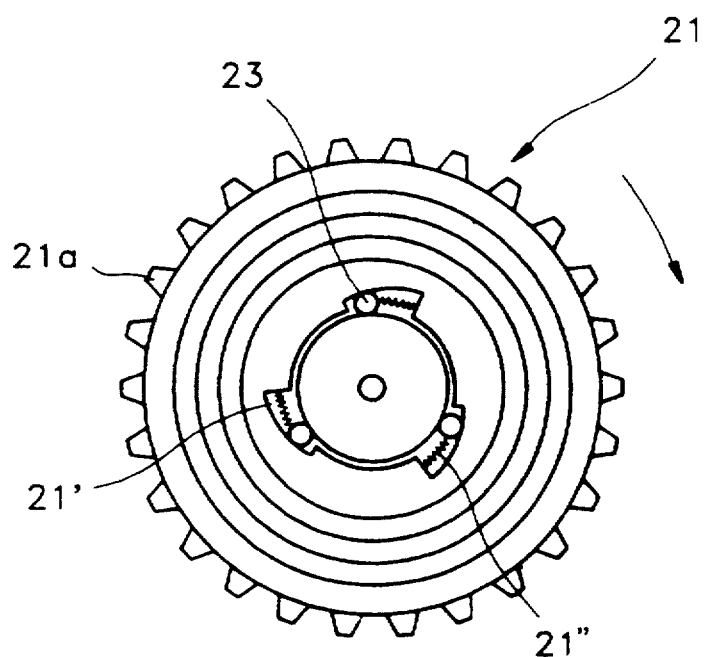
FIG. 6 is a plan view of a driving disk for a direction controller provided in the take-up reel table.

During PLAY or FF, driving gear 30 is driven clockwise and the power is transmitted via intermediate gears 40 and 50 so as to rotate reel disks 14 and 24 clockwise. Here, as can be seen in FIG. 6 (and FIG. 5), ball 23 of driving disk 21 built in take-up reel table 20 is moved toward the narrower portion of slanted groove 21' due to the rotational inertial force, to be put between the wall of driven disk 22 and the wall of slanted groove 21'. Driving disk 21 and driven disk 22 are rotated together to frictionally rotate felt table 27. That is, reel disk 24 and felt table 27 are rotated at a specific rotation force by being frictionally rotated with driven disk 22. Fixed gear 80 engaged with driven disk 22 of take-up reel table 20 is rotated counterclockwise so that floating gear 81 is detached from driven disk 22.

Figure 7:
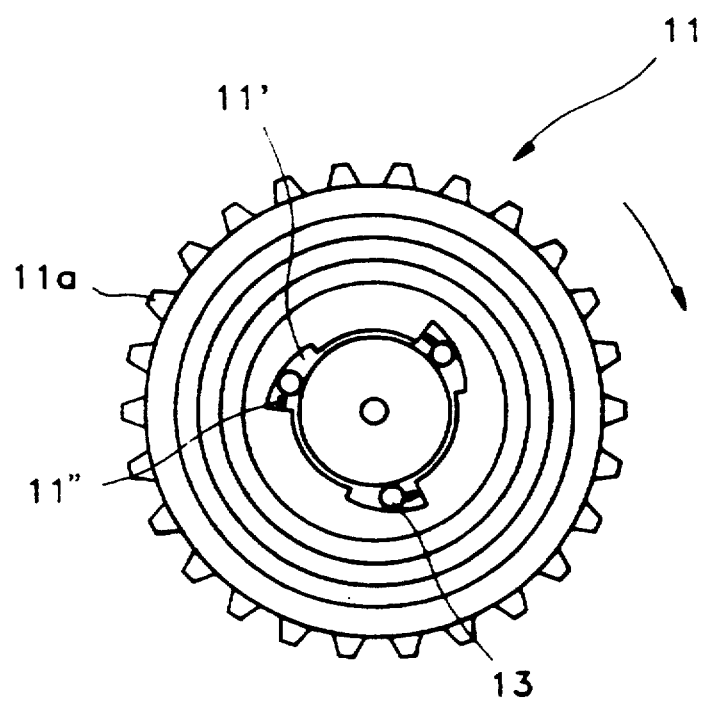
FIG. 7 is a plan view of a driving disk for a direction controller provided in the supply reel table.

As shown in FIG. 7 (and FIG. 2), driving disk 11 on the side of supply reel table 10 is rotated clockwise, so that ball 13 is moved toward the wider portion of slant groove 11' by contracting spring 11" due to the inertial rotation. Driving disk 11 driven being engaged with intermediate gear 40 is raced with respect to driven disk 12. Thus, the tape is loosened from the supply reel (not shown) due to the rotational force of reel disk 24 on the side of take-up reel table 20. Here, tension band 90 is tightened by a tensile device (not shown). Therefore, driven disk 12 is stopped, and felt table 17 and reel disk 14 are frictionally rotated with respect to the driven disk, thereby giving specific tensile force to the tape.

Now, when the mode is changed from PLAY or FF to REV or REW, since driving disks 11 and 21 of reel tables 10 and 20 are connected with driving gear 30 via intermediate gears 40 and 50, the rotating direction of the driving disks is immediately changed. Reel disk 14 of supply reel table 10 is frictionally rotated with respect to direction controller 35, and reel disk 24 on the side of take-up reel table 20 is raced. Referring to FIG. 3, since fixed gear 80 engaged with driven disk 22 of take-up reel table 20 is rotated clockwise, floating gear 81 is engaged with driven gear 81. Therefore, three gears 22, 80 and 81 are engaged at the same time and driven disk 22 is stopped. Thus, reel disk 24 gives tensile force to the tape travelling being frictionally rotated with direction controller 45. Tension band 90 installed on the side of supply reel table 10 is released from driven disk 12. The operation of direction controllers 35 and 45 in the REV and REW modes is similar to the operation in the PLAY and FF modes, so the detailed description thereof will be omitted.

As described above, since reel tables 10 and 20 are connected with driving gear 30 via intermediate gears 40 and 50, the reel driving apparatus of the present invention provides a tape recorder in which a mode change is rapidly carried out. In the tape recorder employing the reel driving apparatus of the present invention, tape loosening does not occur, to thereby enhance the quality of reproduced pictures.

Further, since the tension device for providing tape with tensile force is constructed only with the fixed gear and floating gear which are automatically operated according to the rotating direction of the reel table, a simplified tape recorder is accomplished.

While the present invention has been particularly shown and described with reference to particular embodiments thereof, it will be understood by those skilled in the art that various changes in form and details may be effected therein without departing from the spirit and scope of the invention. For instance, the number of the intermediate gears connecting the two reel tables and driving gear is not limited to two, and an appropriate number of intermediate gears can be disposed depending on the specific structure of the mechanism.

What is claimed is:

1. A reel driving apparatus for a tape recorder for use with a tape reel accommodating a tape, comprising:

first and second reel disks for seating the tape reel accommodating the tape;

first and second reel tables, each including a felt table having a friction felt and being installed at a same axis as said first and second reel disks, respectively, to have a same rotational force as said first and second reel disks, respectively, and direction controller means provided between each respective reel disk and each respective felt table and frictionally rotatable and raced selectively with respect to said felt table according to a rotating direction of said first and second reel tables, said direction controller means transmitting rotation in one direction to a respective one of said reel disks and rotating with respect to said respective one of said reel disks in a direction opposite to said one direction;

a driving gear provided between said first and second reel tables and adapted to be driven;

intermediate gears for connecting said driving gear and respective direction controllers of said first and second reel tables; and tape tension means, provided on a side of at least one of said first and second reel tables, for applying a tensile force to the tape.

2. A reel driving apparatus according to claim 1, wherein each said direction controller means comprises a driven disk rotated at a same axis as that of a respective reel disk and having an annular groove, and a driving disk concentric with said driven disk disposed in the annular groove thereof, said driving disk having an inner periphery having slanted grooves formed thereon and an outer periphery having gears formed thereon for engagement with said intermediate gears, said direction controller means further comprising springs having first ends fixed to respective walls of said slanted grooves and balls connected to second ends of said springs, wherein said balls are movable in said slanted grooves according to the rotating direction of said driving disk to be positioned between or released from a wall of the annular groove of said driven disk and the walls of said slanted grooves.

3. A reel driving apparatus according to claim 1, wherein said tape tension means includes each said direction controller means comprising a driven disk rotated at a same axis as that of a respective reel disk and having an annular groove and a driving disk connected to said driven disk at the annular groove thereof, said driving disk having an inner periphery having slanted grooves formed thereon and an outer periphery having gears formed thereon for engagement with said intermediate gears, said direction controller means further comprising springs each having first ends fixed to respective walls of said slanted grooves and balls connected to second ends of said springs, said tape tension means further comprising a fixed gear engageable with said driven disk, a floating gear engageable with said fixed gear and movable along said fixed gear to be connected to or separated from said driven disk in a rotating direction of said fixed gear, and a connecting lever for connecting said fixed gear and said floating gear, such that said floating gear is engageable with said driven disk according to the rotating direction of said fixed gear.

4. A reel driving apparatus according to claim 3, further comprising an extended portion extending from said connecting lever and a stop for blocking said extended portion provided at a predetermined location within a rotational range of said connecting lever, so as to prevent over-rotation of said floating gear due to rotation of said fixed gear.

5. A reel driving apparatus according to claim 1, further comprising detaching means for attaching or detaching said intermediate gears from said first and second reel tables.

6. A reel driving apparatus according to claim 5, wherein said detaching means comprises a plurality of links for connecting said driving gear and said intermediate gears such that said driving gear and said intermediate gears are always engaged with each other and such that said intermediate gears are movable while engaged with said driving gear, a cam adapted to be driven by a driving source, a cam lever pivotally installed to be rotatable and having a first end connected to said plurality links and a second end engaged with said cam, and springs connected between the plurality of links, such that said intermediate gears are selectively attached or detached from said first and second reel tables according to rotation of said cam.

7. A reel driving apparatus for a tape recorder and adapted for used with a tape reel having a tape wound thereon, comprising:

first and second reel disks for accommodating the tape reel;

first and second reel tables each having a felt table installed at a same axis as said first and second reel disks, respectively, to have a same rotational force as respective first and second reel disks, and a direction controller means provided between each respective reel disk and each respective felt table and frictionally rotatable selectively with said felt table according to a rotational direction of said first and second reel tables, said direction controller means transmitting rotation in one direction to a respective one of said reel disks and rotating with respect to said respective one of said reel disks in a direction opposite to said one direction;

a first gear adapted to be driven and positioned between said first and second reel tables;

a second gear for connecting said first gear and said direction controller of each said first and second reel tables; and a mechanism for applying a predetermined tensile force to the tape accommodated in said tape reel.

8. A reel driving apparatus according to claim 7, wherein each of said direction controller means comprises a driven disk having an annular groove and a driving disk concentric with said driven disk disposed in said annular groove.

9. A reel driving apparatus according to claim 8, wherein said driving disk has an inner periphery having second grooves formed thereon and an outer periphery having gears formed thereon for engagement with said second gear.

10. A reel driving apparatus according to claim 9, wherein said driving disk further includes a spring having a first end fixed to a wall of each of said second grooves of said driving disk and a ball connected to a second end of said spring, wherein each said ball is movable in said second grooves according to the rotating direction of said driving disk, so as to be positioned between or released from the wall of the first groove of said driven disk and the wall of respective second grooves.

11. A reel driving apparatus according to claim 7, wherein said tensile force applying mechanism comprises said direction controller, a fourth gear engageable with said driven disk, a fifth gear engageable with said fourth gear and movable along said fourth gear so as to be connected to or separated from said driven disk in a rotating direction of said fourth gear, and a lever for connecting said fourth gear and said fifth gear such that said fifth gear is engageable with said driven disk according to the rotating direction of said fourth gear.

12. A reel driving apparatus according to claim 11, wherein said lever includes a first portion extending therefrom.

13. A reel driving apparatus according to claim 12, wherein said lever further includes a mechanism for blocking said first portion so as to prevent over-rotation of said fifth gear due to rotation of said fourth gear.

14. A reel driving apparatus according to claim 11, further comprising a device for selectively attaching or detaching said third gear from said first and second reel tables.

15. A reel driving apparatus according to claim 14, wherein said detaching and attaching device comprises a plurality of links for connecting said first gear and said second gear such that said first gear and said second gear are continually engaged with each other and said second gear is movable while engaged with said first gear.

16. A reel driving apparatus according to claim 15, wherein said detaching and attaching device further comprises a cam adapted to be driven by a driving source.

17. A reel driving apparatus according to claim 16, wherein said detaching and attaching device further comprises a cam lever pivotally installed to be rotatable and having a first end connected to said plurality of links and a second end engaged with said cam.

18. A reel driving apparatus according to claim 17, wherein said detaching and attaching device further comprises springs connected between the plurality of said links, such that said third gear is selectively attachable or detachable from said first and second reel tables according to rotation of said cam.

19. A reel driving apparatus for a tape recorder for use with a tape reel accommodating a tape, comprising:

first and second reel disks for seating the tape reel accommodating the tape;

first and second reel tables, each including a felt table having a friction felt and being installed at a same axis as said first and second reel disks, respectively, to have a same rotational force as said first and second reel disks respectively, and a direction controller provided between each respective reel disk and each respective felt table and frictionally rotatable and raced selectively with respect to said felt table according to a rotating direction of said first and second reel tables, wherein each said direction controller comprises a driven disk rotated at a same axis as that of a respective reel disk and having an annular groove, and a driving disk concentric with said driven disk disposed in the annular groove, said driving disk having an inner periphery having slanted grooves formed thereon and an outer periphery having gears formed thereon for engagement with said intermediate gears;

said direction controller further comprising springs having first ends fixed to respective walls of said slanted grooves and balls connected to second ends of said springs;

wherein said balls are movable in said slanted grooves according to the rotating direction of said driving disk to be positioned between or released from a wall of the annular groove of said driven disk and the walls of said slanted grooves:

a driving gear provided between said first and second reel tables and adapted to be driven;

intermediate gears for connecting said driving gear and respective direction controllers of said first and second reel tables; and tape tension means, provided on a side of at least one of said first and second reel tables, for applying a tensile force to the tape.

20. A reel driving apparatus for a tape recorder for use with a tape reel accommodating a tape, comprising:

first and second reel disks for seating the tape reel accommodating the tape;

first and second reel tables, each including a felt table having a friction felt and being installed at a same axis as said first and second reel disks, respectively, to have a same rotational force as said first and second reel disks respectively, and a direction controller provided between each respective reel disk and each respective felt table and frictionally rotatable and raced selectively with respect to said felt table according to a rotating direction of said first and second reel tables;

a driving gear provided between said first and second reel tables and adapted to be driven;

intermediate gears for connecting said driving gear and respective direction controllers of said first and second reel tables; and tape tension means, provided on a side of at least one of said first and second reel tables, for applying a tensile force to the tape, said tape tension means includes said direction controllers which comprise a driven disk rotated about a same axis as that of a respective reel disk and having an annular groove, and a driving disk connected to said driven disk having an inner periphery having slanted grooves formed thereon and an outer periphery having gears formed thereon for engagement with said intermediate gears;

said direction controller further comprising springs each having first ends fixed to respective walls of said slanted grooves and balls connected to second ends of said springs;

said tape tension means further comprising a fixed gear engageable with said driven disk, a floating gear engageable with said fixed gear and moveable along said fixed gear to be connected to or separated from said driven disk in a rotating direction of said fixed gear, and a connecting lever for connecting said fixed gear and said floating gear such that said floating gear is engageable with said driven disk according to the rotating direction of said fixed gear.

21. A reel driving apparatus according to claim 20, further comprising an extended portion extending form said connecting lever and a stop for blocking said extended portion provided at a predetermined location within a rotational range of said connecting lever, so as to prevent over-rotation of said floating gear due to rotation of said fixed gear.

22. A reel driving apparatus for a tape recorder for use with a tape reel accommodating a tape, comprising:
first and second reel disks for seating the tape reel accommodating the tape;
first and second reel tables, each including a felt table having a friction felt and being installed at a same axis as said first and second reel disks respectively, to have a same rotational force as said first and second reel disks respectively, and a direction controller provided between each respective reel disk and each respective felt table and frictionally rotatable and raced selectively with respect to said felt table according to a rotating direction of said first and second reel tables;
a driving gear provided between said first and second reel tables and adapted to be driven;
intermediate gears for connecting said driving gear and respective direction controllers of said first and second reel tables;
tape tension means, provided on a side of at least one of said first and second reel tables, for applying a tensile force to the tape; and
detaching means for attaching or detaching said intermediate gears from said first and second reel tables, said detaching means comprising a plurality of links for connecting said driving gear and said intermediate gears such that said driving gear and said intermediate gears are always engaged with each other and such that said intermediate gears are moveable while engaged with said driving gear, a cam adapted to be driven by a driving source, and a cam lever pivotally installed to be rotatable and having a first end which is connected to said plurality of links such that said intermediate gears are selectively attached or detached form said first and second reel tables according to rotation of said cam.

23. A reel driving apparatus for a tape recorder and adapted for used with a tape reel having a tape wound thereon, comprising:

first and second reel disks for accommodating the tape reel;
first and second reel tables each having a felt table installed at a same axis as said first and second reel disks respectively, to have a same rotational force as respective first and second reel disks, and a direction controller provided between each respective reel disk and each respective felt table and frictionally rotatable selectively with said felt table according to a rotational direction of said first and second reel tables, each of said direction controllers comprises a driven disk having an annular groove and a driving disk concentric with said driven disk disposed in said annular groove;
a first gear adapted to be driven and positioned between said first and second reel tables;
a second gear for connecting said first gear and said direction controller of each said first and second reel tables; and
a mechanism for applying a predetermined tensile force to the tape accommodated in said tape reel.

24. A reel driving apparatus according to claim 23, wherein said driving disk further includes a spring having a first end fixed to a wall of each of said second grooves of said driving disk and a ball connected to a second end of said spring, wherein each said ball is movable in said second grooves according to the rotating direction of said driving disk, so as to be positioned between or released from the wall of the first groove of said driven disk and the wall of respective second grooves.

25. A reel driving apparatus for a tape recorder and adapted for used with a tape reel having a tape wound thereon, comprising:
first and second reel disks for accommodating the tape reel;
first and second reel tables each having a felt table installed at a same axis as said first and second reel disks respectively, to have a same rotational force as respective first and second reel disks, and a direction controller means provided between each respective reel disk and each respective felt table and frictionally rotatable selectively with said felt table according to a rotational direction of said first and second reel tables;
a first gear adapted to be driven and positioned between said first and second reel tables;
a second gear for connecting said first gear and said direction controller of each said first and second reel tables; and
a mechanism for applying a predetermined tensile force to the tape accommodated in said tape reel, said tensile force applying mechanism comprises said direction controllers, a fourth gear engageable with said driven disk, a fifth gear engageable with said fourth gear and moveable along said fourth gear so as to be connected to or separated from said driven disk in a rotating direction of said fourth gear, and a lever for connecting said fourth gear and said fifth gear such that said fifth gear is engageable with said driven disk according to the rotating direction of said fourth gear.

26. A reel driving apparatus according to claim 25, wherein said lever includes a first portion extending therefrom.

27. A reel driving apparatus according to claim 26, wherein said lever further includes a mechanism for blocking said first portion so as to prevent over-rotation of said fifth gear due to rotation of said fourth gear.

28. A reel driving apparatus according to claim 25, further comprising a device for selectively attaching or detaching said third gear from said first and second reel tables.

29. A reel driving apparatus according to claim 28, wherein said detaching and attaching device comprises a plurality of links for connecting said first gear and said second gear such that said first gear and said second gear are continually engaged with each other and said second gear is movable while engaged with said first gear.

30. A reel driving apparatus according to claim 29, wherein said detaching and attaching device further comprises a cam adapted to be driven by a driving source.

31. A reel driving apparatus according to claim 30, wherein said detaching and attaching device further comprises a cam lever pivotally installed to be rotatable and having a first end connected to said plurality of links and a second end which is engaged with said cam.

32. A reel driving apparatus according to claim 31, wherein said detaching and attaching device further comprises springs connected between the plurality of said links, such that said third gear is selectively attachable or detachable from said first and second reel tables according to rotation of said cam.

* * * * *